US012657322B2

(12) United States Patent
Barnett et al.

(10) Patent No.:  US 12,657,322 B2
(45) Date of Patent:      Jun. 16, 2026

(54) INTEGRITY VERIFICATION MECHANISM FOR PROTECTION AGAINST CONTAINER MIGRATION ATTACKS

(71) Applicant: Dell Products L.P., Round Rock, TX (US)

(72) Inventors: Alan Barnett, County Cork (IE); Ahmed Khalid, Cork (IE); Matthew Keating, Cork (IE)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/496,461

(22) Filed: Oct. 27, 2023

(65) Prior Publication Data

US 2025/0139270 A1      May 1, 2025

(51) Int. Cl.
 *G06F 21/54* (2013.01)
 *G06F 21/60* (2013.01)
 *G06F 21/62* (2013.01)
(52) U.S. Cl.
 CPC .......... *G06F 21/6218* (2013.01); *G06F 21/54* (2013.01); *G06F 21/604* (2013.01)
(58) Field of Classification Search
 CPC .... G06F 21/6218; G06F 21/54; G06F 21/604; G06F 21/64
 See application file for complete search history.

(56) References Cited

U.S. PATENT DOCUMENTS 10,396,997 B2 *   8/2019   Brady .................... G06Q 50/18
11,296,867 B2 *   4/2022   Scott ..................... G06F 21/64
11,588,646 B2 *   2/2023   Ilany et al. ........... G06F 21/554
2015/0156188 A1 *   6/2015   Wang ...................... G06F 16/21
                                                              726/4
2018/0109501 A1 *   4/2018   Pawgi ................. H04L 63/0428
2019/0332421 A1 *   10/2019   Kozlowski ............ G06F 9/4856
2020/0192689 A1 *   6/2020   Smith, IV ........... G06F 9/45558
 (Continued)

FOREIGN PATENT DOCUMENTS

CN      114172729 A  *  3/2022   ........... H04L 63/123

OTHER PUBLICATIONS

Immutable Log Storage as a Service on Private and Public Blockchains (Year: 2021).*

(Continued)

*Primary Examiner* — Philip J Chea
*Assistant Examiner* — Jasmine Mochen Day
(74) *Attorney, Agent, or Firm* — Workman Nydegger

(57) ABSTRACT

One example method includes receiving, at a target, a migrated container, the container being migrated by a source, retrieving, by the target, a first container hash from an immutable distributed ledger, the first container hash being created at the source by hashing the container, and the first container hash being written by the source to the immutable distributed ledger, hashing, at the target, the container to create a second container hash, writing, by the target, the second container hash to the immutable distributed ledger, and determining, by the target, whether the first container hash and the second container hash match, and a failure of the first container hash to match the second container hash indicates that in-flight tampering of the container has occurred while the container was migrating from the source to the target.

18 Claims, 2 Drawing Sheets

(56)                 References Cited

U.S. PATENT DOCUMENTS

| | | | |
|---|---|---|---|
| 2021/0319441 A1* | 10/2021 | Knobel | H04L 9/3236 |
| 2022/0091874 A1* | 3/2022 | Janakiram | G06F 9/4856 |
| 2022/0114273 A1* | 4/2022 | Njemanze | G06N 3/0499 |
| 2023/0027329 A1* | 1/2023 | Durham | G06F 21/54 |
| 2023/0342496 A1* | 10/2023 | Doshi | G06F 21/6281 |
| 2024/0235843 A1* | 7/2024 | Davies | H04L 9/3239 |

OTHER PUBLICATIONS

A Multilayer Distributed Ledger Technology Architecture for Immu-table Registry of Mobility and Location Information (Year: 2022).*
The Approach to Managing Provenance Metadata and Data Access Rights in Distributed Storage Using the Hyperledger Blockchain Platform (Year: 2018).*

\* cited by examiner

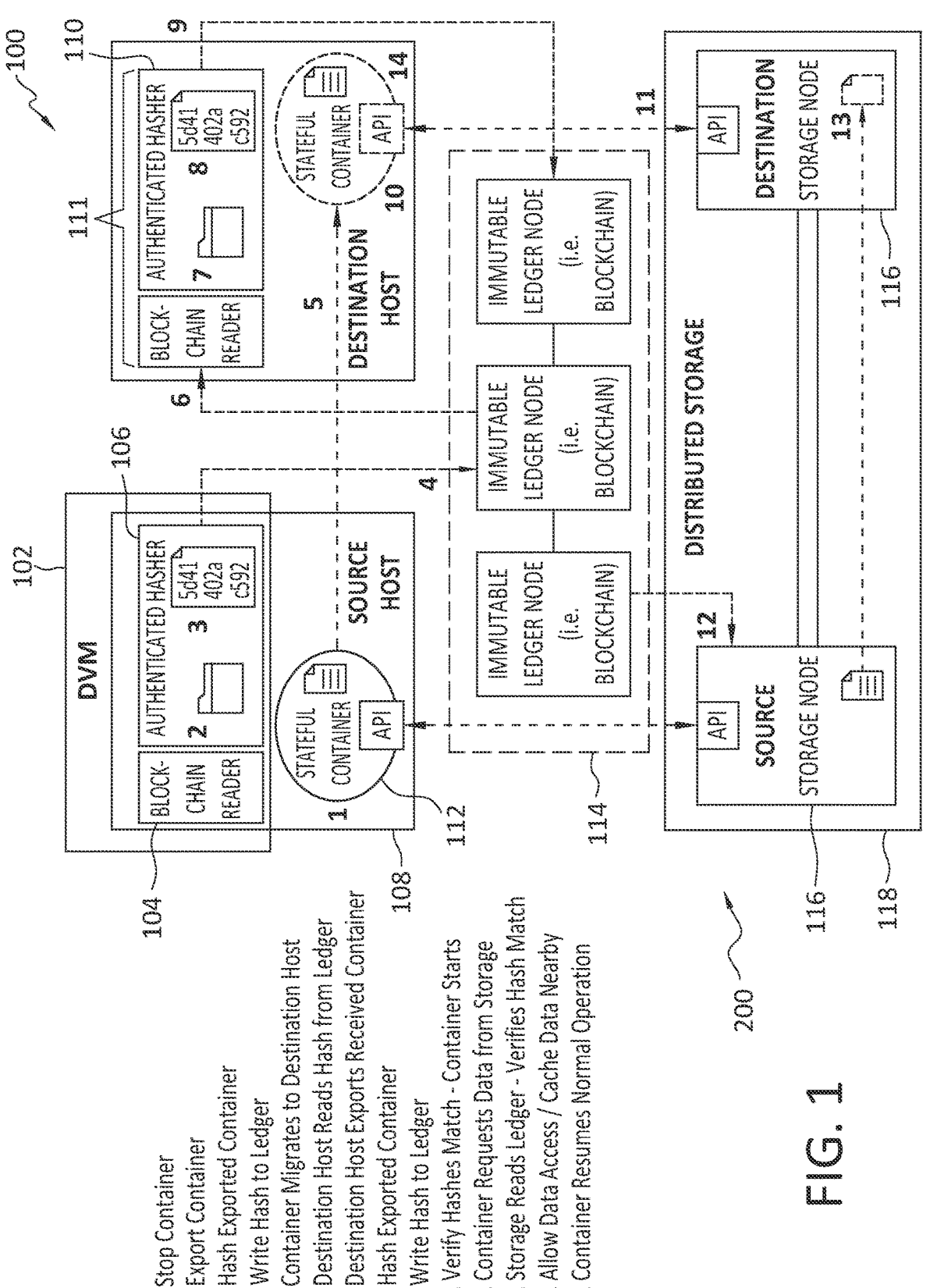

1. Stop Container
2. Export Container
3. Hash Exported Container
4. Write Hash to Ledger
5. Container Migrates to Destination Host
6. Destination Host Reads Hash from Ledger
7. Destination Host Exports Received Container
8. Hash Exported Container
9. Write Hash to Ledger
10. Verify Hashes Match - Container Starts
11. Container Requests Data from Storage
12. Storage Reads Ledger - Verifies Hash Match
13. Allow Data Access / Cache Data Nearby
14. Container Resumes Normal Operation

FIG. 1

INTEGRITY VERIFICATION MECHANISM FOR PROTECTION AGAINST CONTAINER MIGRATION ATTACKS

FIELD OF THE INVENTION

Embodiments of the present invention generally relate to container security and integrity. More particularly, at least some embodiments of the invention relate to systems, hardware, software, computer-readable media, and methods, for protection against attacks on a container while the container is in flight between hosts or other entities.

BACKGROUND

A container migration attack targets in-flight, mid-migration containerized applications between hosts. Container migration has been used by attackers as an opportunity for attacks such as denial of service, man-in-the-middle, and replay attacks. A particular problem is container migration tampering, where an attacker modifies or replaces a legitimate container, mid-migration, to deploy malicious software. Malware could spy and harvest sensitive data, viruses could carry out a more active attack, for example to crash the host system. Encrypting vital data on the host, or external data on accessible cloud storage, using ransomware is another potential impact. A compromised container affects the containerized application, the host on which it runs, or other external systems to which it connects.

Containerized applications can be either stateless or stateful. Stateless containers do not save their state—and compromising one of these could also allow one to compromise associated services, as well as potentially higher value systems, possibly enabling the attacker to progress the attack. Stateful containers often use external persistent storage to store container state data. Stateful containers are often authenticated to auxiliary systems such as external cloud storage or applications, and a compromised stateful container could also compromise these systems. As the attack surface for the container migration attack is largest when the container is in-flight between hosts, this is a particularly concerning aspect of the overall migration process. Following are further details concerning these, and other, problems known to exist.

In particular, cloud stores handle externalized container state data similar to other data types, despite its intrinsic link to the respective container application. Because the containerized application requires access to the data for its operation, it is common for storage systems to implement caching to ensure that the necessary state files reside on a storage node close to where the stateful container is operating. In these scenarios, migrating containerized applications can trigger the caching of their data on storage to a particular nearby node. Such an approach may be considered secure in a trustworthy network where the applications are unlikely to leave the network and hence the communication channels are unlikely to be compromised. However, in a distributed environment with multiple networks owned by multiple entities and inter-cluster communication, if a container is compromised during migration, problems may arise due to the fact that the compromised container has access to the externalized state data and storage. This will effectively result in some level of compromised data as well as the cloud storage system. The same problem exists in other external systems and services being used by the microservices, such as telemetry and monitoring infrastructures or network controllers, for example. Such systems are vulnerable to attacks if they connect to authenticated, but compromised containers, without some other verifications.

Another problem is that a container compromised by an attack during migration gives the attacker some access, such as read, write, and delete, for example, to the externally stored container data and, often, write access is necessary in these scenarios for these applications to be able to periodically save their work. This could also form part of a more complex attack such as, for example, compromised containers triggering caching of large amounts of the externalized state data to a particular storage node. This raises the impact of a cyberattack on that node and could also be exploited to degrade the node services by attempting to place as much data, and as many requests as possible on the node with the aim of flooding it in a DDOS (distributed denial of service) style attack, which would see service degraded to legitimate applications.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 discloses aspects of an architecture and associated method, according to one embodiment.

DETAILED DESCRIPTION OF SOME EXAMPLE EMBODIMENTS

Figure 2:
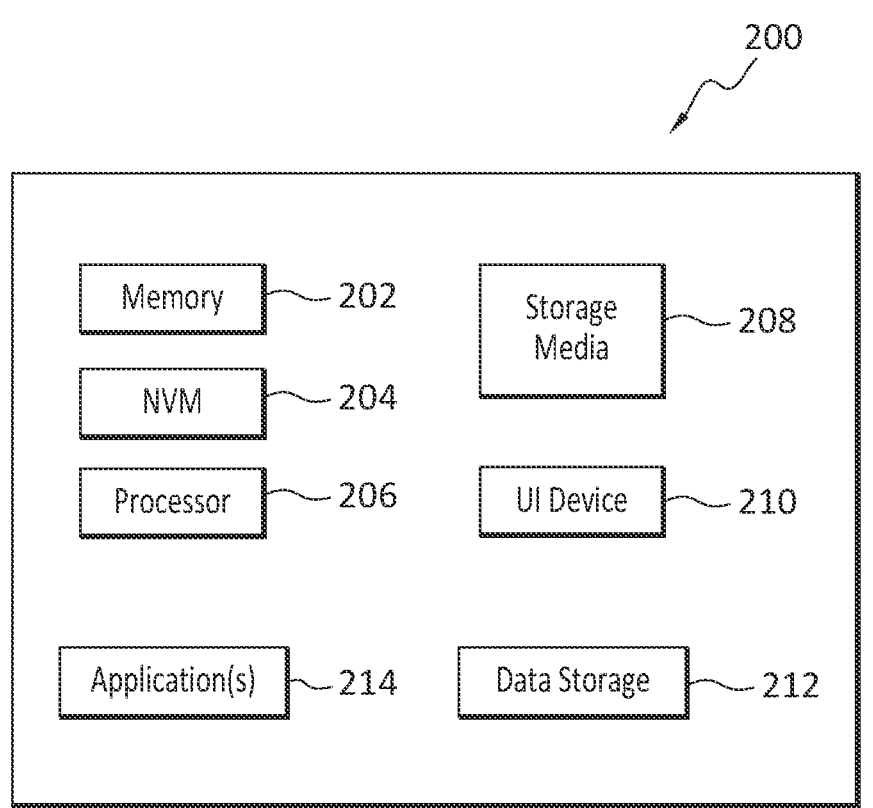
FIG. 2 discloses aspects of a computing entity operable to perform any of the disclosed methods, processes, and operations . . .

Embodiments of the present invention generally relate to container security and integrity. More particularly, at least some embodiments of the invention relate to systems, hardware, software, computer-readable media, and methods, for protection against attacks on a container while the container is in flight between hosts or other entities.

In one example embodiment, a container that is to be migrated is hashed to create a first hash, and the first hash is stored in an immutable ledger, such as a blockchain for example. The container is then migrated to a destination host. The destination host reads the first hash from the immutable ledger and then generates a second hash by hashing the received container. The second hash may be stored in the immutable ledger. A comparison may then be performed of the first hash and the second hash. If the first and second hashes match, then the destination host is assured that no changes have been made to the container while the container was in flight from the sender, and the container may be permitted to start. After startup, and as part of its operations, the container may, for example, request data from storage. Upon receiving such a request, the storage may read the immutable ledger to verify that the first and second hashes match and, upon verification, the storage may permit the container to access the data so that the container can then resume normal operations.

Embodiments of the invention, such as the examples disclosed herein, may be beneficial in a variety of respects.

For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that a recipient of a container can determine whether or not that container was compromised while in flight to the recipient. An embodiment may reduce, or eliminate, the possibility of a centralized attack directed against all container traffic. An embodiment may provide verification of the integrity of a container at various points during migration of the container. An examiner may provide detailed insight into successful and unsuccessful attacks directed at a container. Various other advantages of one or more embodiments will be apparent from this disclosure.

A. Overview of Aspects of an Example Embodiment

One of the security challenges in distributed microservice environments with multiple autonomous systems, is to verify the identity of a migrated microservice or container. Such environments lack a centralized control plane and hence the devices, controllers or hosts in the ecosystem require a mechanism to access the integrity-related information before importing a container into their system. Thus, an example embodiment may employ a distributed immutable ledger with proofs and guarantees for external systems, such as storage or container runtime.

In cold migrations, a container is stopped before migration. An unmodified instance of a stopped container will produce the same hash value, which allows for tamper checking when migrating that container. However, a challenge in current systems is that there is no way to share that hash in a trustworthy manner in a decentralized environment. As used herein, a 'cold' container includes a container that is powered off, as compared with a live container that is powered on. Correspondingly, a 'cold migration' includes movement of a container which has been powered off prior to the movement.

Thus, an example embodiment comprises an immutable hash log component, which acts as the "source of truth," against which container hashes may be compared, and leverages immutable ledger technology to store hashes and uses unique credentials for strong integrity and security guarantees. In an embodiment, this immutable ledger may be accessed by any component in the system, enabling verification of the containers by components without the presence of a centralized authority, thus supporting zero-trust methods of operation.

An embodiment may also comprise an authenticated hashing component to generate the hashes of the container data and write them to the immutable hash log. In an embodiment, servers and devices enabled with this security mechanism may run this component as part of the container migration process. Write requests to the immutable ledger may only be authorized and accepted from this component, hence guaranteeing valid trustworthy records of container hashes. As well, an example embodiment provides for detection of tampering that occurs during container migration, which is a major possible impact of a container migration attack.

B. Detailed Discussion of Aspects of an Embodiment

B.1 Introduction

One example embodiment comprises an integrity verification mechanism that operates in distributed or decentralized environments, such as edge networks, and zero-trust (ZT) architectures. An embodiment may use hashes to verify the integrity of cold-migrated containers against their pre-migrated state before allowing the containers to resume operations on the destination host, or access and send requests to their associated storage and other external systems. This approach enables detection of tampering from a container migration attack and mitigate the attack by not resuming the compromised container. Similarly, the external systems and storages verify the identity before interacting with the container.

B.2 Discussion

An example embodiment comprises a mechanism to verify the integrity of a containerized application prior to it being allowed to resume operation on the destination host. After the container has resumed operation, it may be verified before allowing it to access externalized container data, and prior to allowing the container to trigger a storage operation such as caching or replication. Each external system performs its own verification, hence enabling operation in low, or zero, trust environments.

This verification procedure may specifically cover the end-to-end migration process, which is one possible attack surface for a container migration attack. A mechanism according to one embodiment can plug directly into existing migration processes and may be agnostic to the underlying procedure. An embodiment may provide strong integrity guarantees and subsequently protect the data, the containerized applications, and associated systems against malicious tampering carried out, or attempted, during container migration attacks. With attention now to FIG. 1, a discussion is provided of various components of an example embodiment of an architecture 100.

B.2.1 DVM (Decentralized Verification Module)

A component of one example embodiment is invention is the DVM 102 (decentralized verification module), which may comprise a reader 104 and authenticated hashing mechanism 106. The DVM 102 may take the form of an application that is installed on the machines or systems which containers will potentially operate on, or migrate to.

Thus, in the example of FIG. 1, the DVM 102 is shown as residing at a source host 108 prior to migration to a destination, such as a host 110. Note that the host 110, like the host 108, may comprise an instance of a DVM 111 that comprises a reader and authenticated hashing mechanism.

An embodiment of the DVM 102 may employ cryptographic standard hashing to produce a non-reversible hash code representation of a container, such as the container 112, which may be a stateful container, which can be uploaded to an immutable distributed ledger 114, comprising a blockchain for example, using a privileged operation, as disclosed below. In an embodiment, the DVM 102 may reside within a standard migration process, in particular, by stopping the container 112, exporting the container 112 as a compressed file and generating a hash of that file. The hash may be generated immediately prior to migration of the container 112 unless there is already a hash uploaded earlier to the immutable distributed ledger 114 for a specific container version. The DVM 102 may work in a software-only configuration, but, in an embodiment, hardware-rooting may provide stronger guarantees. The data entry written to the immutable distributed ledger 114 by the DVM 102 may comprise a container 112 ID, timestamp, DVM ID (system component), and hash value of the container 112.

As further disclosed in the example of FIG. 1, the source host 108, the destination host 110, and the immutable distributed ledger 114 may communicate with one or more storage nodes 116 of a distributed storage system 118. Briefly, data 120 may be migrated from a source storage node 116 to a destination storage node 116, and made accessible to a container by the destination storage node 116 upon verification of a migrated container by the distributed storage system 118.

B.2.2 DLT (Distributed Ledger Technology)

With continued reference to FIG. 1, the example architecture 100 may further comprise, as noted above, an immutable ledger 114, which may comprise a blockchain or other distributed ledger technology (DLT). The immutable ledger 114 may act as a reference of verified legitimate container hashes, against which post-migration container hashes may be compared as part of a verification process. The immutability and chaining of hashes in a ledger system, such as blockchain or Hashgraphs for example, may increase the strength of integrity guarantees compared with singular hashes—as any change in the backlog of hashes will produce an inconsistency in the latest hash of the chain.

In an embodiment, the immutable distributed ledger 114 may comprise a blockchain which the authenticated hashing mechanism 106, as well as an authenticated hashing mechanism of the DVM 111, writes to. The blockchain may enforce access control on a granular basis, such as per container for example. In an embodiment, the blockchain comprises an immutable list of hashes, each representing a respective container, as well as many versions of those containers since any minor change in the container, such as a change to a port in the network configuration for example, will cause the hash of that container to change.

The blockchain transactions may also contain any necessary container metadata, such as timestamps, and versioning, for example. In an embodiment, the ability to add new hashes to the blockchain is an operation which requires an elevated level of privilege, and specific login credentials are used to authenticate to the immutable hash log for writing. Only the hashing components possess this level of privilege, and, for example, could be operated by administrators.

In an embodiment, the specific nature of the distributed immutable ledger 114 being used may depend on the nature of the environment that the system is operating in. For example, a consortium of council members operating in a low or zero trust environment, may employ a private or consortium blockchain. Community-led ecosystems may employ a public blockchain for immutable decentralized source of truth. An embodiment may be compatible with blockchains or DLTs operating in any of these environments. However, certain essential features are essential for the operation of the proposed system when selecting the blockchain or DLT, such as access control for example.

B.2.3 Clients

On the client-side, other components may read the immutable distributed ledger 114, which stores the hashes of the containers, to confirm the authenticity of a container, or 'containerized application,' prior to that component establishing a connection with the container. A client may be an edge system, or VM (virtual machine) running the containers, external storage, network components, or various applications which interact with the migrated container in any way. An influential factor may be the operating model of the blockchain, such as public or private blockchain for example. An embodiment may be highly adaptable and may operate in virtually any container migration scenario or blockchain operating model. The ability for any system component to verify container integrity post-migration using an embodiment fits well with a zero-trust philosophy and architecture, as the verification may be performed repeatedly by any authorized system or user application.

C. Example Methods

It is noted with respect to the disclosed methods, including the example method of FIG. 1, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 1, a method according to one embodiment is referenced at 200. In an embodiment, the method 200 may be performed in a cloud computing environment in which containers may be migrated from one host to another. The cloud computing environment may comprise, or have access to, data storage assets that may comprise data accessible by the containers. The data may reside in a distributed storage environment which may or may not comprise an element of the cloud computing environment. The distributed storage environment may comprise various storage nodes between, and among, which data may be migrated. However, the scope of the invention does not require, nor is limited to, any particular operating environment.

Initially, a container 112, which may be a stateful container, running on the source host 108 is stopped (1), as part of a cold migration process. The container 112 may then be exported (2) to the DVM 102 instance, running on the source host 108, using a standard export procedure. The exported container is hashed (3) by the authenticated hashing mechanism 106 of the DVM 102 on the source host 108. A strong hashing mechanism, such as SHA-1 for example, may used to ensure that the hashing operation is irreversible. The DVM running on the source host writes (4) an entry into the immutable distributed ledger 114 that includes the container ID, timestamp, DVM ID (system component), and hash value of the container 112. The DVM 102 may be provided with privileges and signatures needed in order to be able to write to the immutable distributed ledger 114. This operation may be handled through secure onboarding of the DVM 102 into the ecosystem. Entities without write access will be unable to make changes to the immutable distributed ledger 114.

Next, the container 112 may be migrated (5) from the source host 108 to the destination host 110, such as by way of a conventional migration process. The DVM instance 111 running on the destination host 110 reads (6) the immutable distributed ledger 114 and retrieves the relevant hash value for the container 112. This may be done by extracting the container ID and the source DVM 102 ID from the received container 102 and finding the corresponding entry in the immutable distributed ledger 114. A timestamp of the container may be used as an additional check to be used in retrieving the relevant hash value. For example, an unexpectedly large transmission time may indicate that the hash value corresponds to a container.

If there are any discrepancies, for example, unmatched hash values, the container 112 is discarded and the source host 108 may be informed of the failure to match. However, if the hash of the imported container 112 matches with the hash retrieved (6) from the immutable distributed ledger, the operation continues.

In particular, the destination host 110 then exports (7) the received container 112, which is then hashed (8) by the DVM 111 instance running on the destination host 110. The DVM instance running on the destination host writes (9) the container hash value to the immutable distributed ledger 114, to record the successful reception and importing of the container 112. This operation may enable external systems to verify the integrity of the migrated container 112. As the DVM running on the destination host has verified (10) that the pre-migration and post-migration container 112 hashes match, it allows the container 112 to be sent to the container runtime and start running.

The started container 112, now running on the destination host, requests (11) its data from the distributed storage 118, if the container 112 is stateful. The distributed storage 118 reads (12) the distributed immutable ledger 114 and verifies that the pre-migration and post-migration container 112 hashes match. The distributed storage 118 may then allow (13) data access by the migrated container 112, and/or caches (13) the relevant data from the container 112 from another node if appropriate. Finally, the container 112 may then fully resume (14) normal operation at the destination host 110.

D. Further Discussion

As apparent from this disclosure, an embodiment may have various useful features and aspects, although no embodiment is required to have any of such features and aspects. The following discussion outlines some of these.

In an embodiment, the combination of an authenticated hashing mechanism and distributed ledger technologies may comprise a solution to the problem of container integrity in migration scenarios, going beyond conventional approaches. As well, an embodiment may represent an advance over conventional approaches at list insofar as those conventional approaches do not employ blockchain technology for container migration integrity verification. An embodiment deals with general container hashes, and specifically with pre and post migration container hashes, and comprises the implementation of authenticated, environment-wide, verifiable integrity guarantees for containers through the blockchain, in an up-to-date manner. An embodiment may employ decentralized control preventing in-flight container tampering during container migration while, in contrast, conventional approaches are not known to use such decentralized control, if tamper checks are even present at all. As disclosed herein, the decentralized control implemented by an embodiment makes the tamper checking system more robust and more difficult for a malicious actor to target or trick.

Further, an embodiment, through the use of authenticated hashing to generate pre and post migration hashes, and storing these on a blockchain, creates a verifiable chain of the integrity of the container across migrations. This also provides an immutable log of any integrity mismatches between pre and post migration containers, which acts as a resource to catalogue all tampering, or potential container tampering events across the system, with an extremely specific timeframe associated—as one can determine the exact migration during which the tampering occurred. This is valuable information for ascertaining how breaches into the system which caused the tampering to have occurred. It also allows the aforementioned to be viewed in a unified way, rather than requiring the data to be collated from separate utilities.

Further, by virtue of the various operations disclosed herein, as well as the message composition to the blockchain which must contain specific information regarding the container, the time of migration, and other pertinent data and metadata, an embodiment may ensure that container integrity can be verified and incidents can be accurately investigated. An embodiment may operate in one-to-one migration scenarios where a container is migrated from one host to one host, as well as one-to-many migration scenarios where one container is migrated to multiple hosts, and many-to-many migration scenarios where multiple containers are migrated to multiple hosts, and offers an immutable and distributed approach to effectively and efficiently verify container integrity.

Finally, conventional approaches, in contrast with an embodiment, do not allow every other system component to verify container integrity, and instead of using a distributed immutable ledger for this purpose as in the case of one embodiment, instead rely on centralized control planes. Further, conventional approaches typically focus on the container itself, whereas an embodiment operates to protect externalized container state data and storage or other external systems that connect to the container. An embodiment may also account for the intrinsic link between containers and data on cloud storage which prevents compromised containers to initiate actions such as file caching in the external storage system. In an embodiment, the ability to operate in a zero-trust configuration assists in protection against such attacks.

E. Some Illustrative Examples

One possible application, undertaken by one or more of the inventors, for an embodiment concerns use of analytics for predictive maintenance in manufacturing plants. This project provided insight into real-world manufacturing plants across multiple domains, and in developing the analytics tools used there. Those tools comprised containerized microservices that carried out a variety of functions and migrated around to various machinery and tools within a plant and across plants in order to perform data harvesting, processing, and analysis.

This is an applicable real-world scenario in which an embodiment could operate and provide value. In these scenarios, integrity checking of containers was only carried out at the repository level, and post-flight checking was not used. These systems also do not leverage distributed ledger technology with verifiable historic chaining of hashes. Peripheral services and applications connecting to these containers was a common occurrence. The fact that the network was private/isolated within a plant was regarded as safe proofing against the tampering examples earlier.

E.1 Example 1

In the aforementioned scenario involving the use of containerized applications, migrating to various locations within and across manufacturing plants, an embodiment may be used to verify container integrity post-migration before allowing a container to start up on the receiving machine. Before migration, the cold container has its hash generated by the hashing mechanism, which is then stored on the blockchain. Once the container arrives at the destination for migration, the receiving machine generates its hash and compares this against the pre-migration entry on the blockchain in order to verify the integrity of the container before allowing it to start. If the hashes do not match, then this can be reported, and the particulars of the incident logged. If the hashes do match, then the container starts and operates as normal.

E.2 Example 2

Persistent storage is sometimes employed in stateful containerized architectures and can be used to store container state so that it persists across migrations. In this scenario, the persistent storage may leverage a distributed ledger, according to an embodiment, in order to verify that a recently migrated container was not tampered with in-flight. In this scenario, the persistent storage may be capable of reading the ledger in order to verify that the hash logged after migration matches the one logged before migration, and only after this would the persistent storage allow the container storage access.

F. Further Considerations

Increasing uptake of containers results in new security challenges in distributed environments such as edge computing environments. Containerization is heavily utilized at the Edge due to portability and the wide variety of edge devices present in a cluster. Many enterprise offerings could face container migration attacks in future. Verifying container authenticity post-migration may be important to protect edge systems, and subsequently other devices and systems between them and the cloud. The example of a compromised container triggering cloud migrations may be relevant in such scenarios.

Further, businesses or companies which use or interact with containerized applications, sometimes referred to simply as 'containers,' in any way may employ an embodiment to ensure integrity of containers during the migration procedure. Additionally, storage providers and platforms may employ an embodiment to verify integrity, as could various other components, such as the network infrastructure.

G. Further Example Embodiments

Following are some further example embodiments of the invention. These are presented only by way of example and are not intended to limit the scope of the invention in any way.

Embodiment 1. A method, comprising: hashing, at a source, a container to create a first container hash; writing, by the source, the first container hash to an immutable distributed ledger; migrating, by the source, the container to a target; retrieving, by the target, the first container hash from the immutable distributed ledger; hashing, at the target, the container to create a second container hash; writing, by the target, the second container hash to the immutable distributed ledger; and determining, by the target, whether the first container hash and the second container hash match, and a failure of the first container hash to match the second container hash indicates that in-flight tampering of the container has occurred while the container was migrating from the source to the target.

Embodiment 2. The method as recited in any preceding embodiment, wherein the immutable distributed ledger comprises a blockchain, and the first container hash and the second container hash comprise respective blocks of the blockchain.

Embodiment 3. The method as recited in any preceding embodiment, wherein when the first container hash is determined to match the second container hash, the container is permitted to start running at the target.

Embodiment 4. The method as recited in any preceding embodiment, wherein both the first container hash and the second container hash are non-reversible.

Embodiment 5. The method as recited in any preceding embodiment, wherein the immutable distributed ledger is configured to enforce access control to the container, and one or more other containers, on a per-container basis.

Embodiment 6. The method as recited in any preceding embodiment, wherein when the first container hash is determined to match the second container hash, the container is permitted to resume operation at the target and the container is subsequently verified, by a storage site, before the container is permitted to access data residing at the storage site.

Embodiment 7. The method as recited in any preceding embodiment, wherein the immutable distributed ledger enables an authorized entity, needing access to another container, to independently verify whether or not the another container has been tampered with while the another container was in-flight to that authorized entity.

Embodiment 8. The method as recited in any preceding embodiment, wherein the container is exported as a compressed file prior to creation of the first container hash.

Embodiment 9. The method as recited in any preceding embodiment, wherein when the first container hash and the second container hash do not match each other, the container is discarded, and the source is informed of the failure.

Embodiment 10. The method as recited in any preceding embodiment, wherein retrieving the first container hash comprises retrieving an ID of the container and an ID of a component, of the source, that created the first container hash.

Embodiment 11. A method, comprising: receiving, at a target, a migrated container, the container being migrated by a source; retrieving, by the target, a first container hash from an immutable distributed ledger, the first container hash being created at the source by hashing the container, and the first container hash being written by the source to the immutable distributed ledger; hashing, at the target, the container to create a second container hash; writing, by the target, the second container hash to the immutable distributed ledger; and determining, by the target, whether the first container hash and the second container hash match, and a failure of the first container hash to match the second container hash indicates that in-flight tampering of the container has occurred while the container was migrating from the source to the target.

Embodiment 12. A system, comprising hardware and/or software, operable to perform any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1-11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 2, any one or more of the entities disclosed, or implied, by FIG. 1 and/or elsewhere herein, may take the form of, or include, or be implemented on, or hosted by, a physical computing device, one example of which is denoted at 200. As well, where any of the aforementioned elements comprise or consist of a virtual machine (VM), that VM may constitute a virtualization of any combination of the physical components disclosed in FIG. 2.

In the example of FIG. 2, the physical computing device 200 includes a memory 202 which may include one, some, or all, of random access memory (RAM), non-volatile memory (NVM) 204 such as NVRAM for example, read-only memory (ROM), and persistent memory, one or more hardware processors 206, non-transitory storage media 208, UI device 210, and data storage 212. One or more of the memory components 202 of the physical computing device 200 may take the form of solid state device (SSD) storage. As well, one or more applications 214 may be provided that comprise instructions executable by one or more hardware processors 206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving, at a target, a migrated container, the container being migrated by a source;

retrieving, by the target, a first container hash from an immutable distributed ledger, the first container hash being created at the source by hashing the container, and the first container hash being written by the source to the immutable distributed ledger;

hashing, at the target, the received container to create a second container hash;

writing, by the target, the second container hash to the immutable distributed ledger; and determining, by the target, whether the first container hash and the second container hash match, wherein a failure of the first container hash to match the second container hash indicates that in-flight tampering of the container has occurred while the container was migrating from the source to the target, and wherein, when the first container hash is determined to match the second container hash, the received container is permitted to resume operation at the target and, when the received container is subsequently verified by an external storage site, the received container is permitted to access container data, which is externally stored at the external storage site.

2. The method as recited in claim 1, wherein the immutable distributed ledger comprises a blockchain, and the first container hash and the second container hash comprise respective blocks of the blockchain.

3. The method as recited in claim 1, wherein when the first container hash is determined to match the second container hash, the received container is permitted to start running at the target.

4. The method as recited in claim 1, wherein both the first container hash and the second container hash are non-reversible.

5. The method as recited in claim 1, wherein the immutable distributed ledger is configured to enforce access control to the received container, and one or more other containers, on a per-container basis.

6. The method as recited in claim 1, wherein the immutable distributed ledger enables an authorized entity, needing access to another container, to independently verify whether or not the another container has been tampered with while the another container was in-flight to that authorized entity.

7. The method as recited in claim 1, wherein the received container is exported as a compressed file prior to creation of the first container hash.

8. The method as recited in claim 1, wherein when the first container hash and the second container hash do not match each other, the received container is discarded, and the source is informed of the failure.

9. The method as recited in claim 1, wherein retrieving the first container hash comprises retrieving an ID of the received container and an ID of a component, of the source, that created the first container hash.

10. A non-transitory storage medium having stored therein instructions that are executable by one or more hardware processors to perform operations comprising:

receiving, at a target, a migrated container, the container being migrated by a source;

retrieving, by the target, a first container hash from an immutable distributed ledger, the first container hash being created at the source by hashing the container, and the first container hash being written by the source to the immutable distributed ledger;

hashing, at the target, the received container to create a second container hash;

writing, by the target, the second container hash to the immutable distributed ledger; and determining, by the target, whether the first container hash and the second container hash match, wherein a failure of the first container hash to match the second container hash indicates that in-flight tampering of the container has occurred while the container was migrating from the source to the target, and wherein, when the first container hash is determined to match the second container hash, the received container is permitted to resume operation at the target and, when the received container is subsequently verified by an external storage site, the received container is permitted to access container data, which is externally stored at the external storage site.

11. The non-transitory storage medium as recited in claim 10, wherein the immutable distributed ledger comprises a blockchain, and the first container hash and the second container hash comprise respective blocks of the blockchain.

12. The non-transitory storage medium as recited in claim 10, wherein when the first container hash is determined to match the second container hash, the received container is permitted to start running at the target.

13. The non-transitory storage medium as recited in claim 10, wherein both the first container hash and the second container hash are non-reversible.

14. The non-transitory storage medium as recited in claim 10, wherein the immutable distributed ledger is configured to enforce access control to the received container, and one or more other containers, on a per-container basis.

15. The non-transitory storage medium as recited in claim 10, wherein the immutable distributed ledger enables an authorized entity, needing access to another container, to independently verify whether or not the another container has been tampered with while the another container was in-flight to that authorized entity.

16. The non-transitory storage medium as recited in claim 10, wherein the received container is exported as a compressed file prior to creation of the first container hash.

17. The non-transitory storage medium as recited in claim 10, wherein when the first container hash and the second container hash do not match each other, the received container is discarded, and the source is informed of the failure.

18. The non-transitory storage medium as recited in claim 10, wherein retrieving the first container hash comprises retrieving an ID of the received container and an ID of a component, of the source, that created the first container hash.

* * * * *